United States Patent
Kennedy et al.

(10) Patent No.: US 10,175,081 B2
(45) Date of Patent: Jan. 8, 2019

(54) FLUID LEVEL MEASUREMENT

(71) Applicant: THERMO KING CORPORATION, Minneapolis, MN (US)

(72) Inventors: Pierce D. Kennedy, Galway (IE); Robert Michael Lattin, Minneapolis, MN (US); Erich A. Lucht, Arden Hills, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 244 days.

(21) Appl. No.: 15/192,333

(22) Filed: Jun. 24, 2016

(65) Prior Publication Data

US 2017/0370755 A1 Dec. 28, 2017

(51) Int. Cl.
| | |
|---|---|
| G01F 9/00 | (2006.01) |
| F02B 63/06 | (2006.01) |
| F02D 41/04 | (2006.01) |
| F02M 59/44 | (2006.01) |
| F25D 11/00 | (2006.01) |
| F25D 29/00 | (2006.01) |

(52) U.S. Cl.
CPC .............. *G01F 9/001* (2013.01); *F02B 63/06* (2013.01); *F02D 41/04* (2013.01); *F02M 59/44* (2013.01); *F25D 11/003* (2013.01); *F25D 29/003* (2013.01); *F02D 2200/0625* (2013.01); *F02M 2200/245* (2013.01); *F02M 2200/248* (2013.01)

(58) Field of Classification Search
CPC ......... F02B 63/06; F02D 41/04; F02M 59/44; G01F 9/001
See application file for complete search history.

(56) References Cited

U.S. PATENT DOCUMENTS

| | | | | |
|---|---|---|---|---|
| 4,706,083 | A * | 11/1987 | Baatz ...................... | G01F 9/023 701/123 |
| 2003/0209236 | A1 * | 11/2003 | Kirschke ................. | F02D 41/18 123/690 |
| 2010/0147237 | A1 * | 6/2010 | Lee ....................... | F02M 27/045 123/1 A |
| 2010/0199753 | A1 * | 8/2010 | Renner ................... | B66C 23/42 73/114.52 |
| 2011/0209490 | A1 * | 9/2011 | Mijanovic .......... | B60H 1/00885 62/190 |

FOREIGN PATENT DOCUMENTS

WO 2005077725 8/2005

* cited by examiner

*Primary Examiner* — Kevin A Lathers
(74) *Attorney, Agent, or Firm* — Hamre, Schumann, Mueller & Larson, P.C.

(57) ABSTRACT

A system and method for determining a fluid consumption rate from a fluid tank is described. The fluid tank includes a fuel for an internal combustion engine and the internal combustion engine provides power to a powered system. The method includes determining instantaneous fluid consumption; determining an operating condition of the powered system, the powered system providing a load on the internal combustion engine; determining the load on the internal combustion engine and a state of the internal combustion engine; and calculating the fluid consumption rate based on the instantaneous fuel consumption, the load on the internal combustion engine, and the state of the internal combustion engine.

17 Claims, 5 Drawing Sheets

FLUID LEVEL MEASUREMENT

FIELD

This disclosure relates generally to fluid level measurements. More specifically, the disclosure relates to a system and method for determining a fluid consumption rate, such as a fuel consumption rate.

BACKGROUND

A refrigeration system can be used to control an environmental condition (e.g., temperature, humidity, air quality, etc.) in a conditioned space. The refrigeration system can be configured to include a refrigeration circuit (a compressor, a condenser, a throttling valve, an evaporator, etc.) and a controller. An internal combustion engine can provide power to the refrigeration system when the refrigeration system is used in a transport unit (e.g., a container on a flat car, an intermodal container, truck, a boxcar, or other similar transport unit). The internal combustion engine can include a fuel gauge to indicate how much fuel remains.

SUMMARY

This disclosure relates generally to fluid level measurements. More specifically, the disclosure relates to a system and method for determining a fluid consumption rate, such as a fuel consumption rate.

In an embodiment, the fuel consumption rate can be determined based on instantaneous fuel consumption.

In an embodiment, the fuel consumption rate can be based on instantaneous fuel consumption, a load on the internal combustion engine, and one or more operating conditions that are based on a current state of the powered system.

In an embodiment, the fuel consumption rate can be used to calculate a total fuel consumption for a particular period of time.

A method for determining a fluid consumption rate indicating a fluid consumption rate of a fluid in a fluid tank is disclosed. The fluid tank includes a fuel for an internal combustion engine. The internal combustion engine provides power to a powered system. The method includes determining instantaneous fluid consumption; and determining an operating condition of the powered system. The operating condition is based on a current state of the powered system, the powered system providing a load on the internal combustion engine. The method further includes determining the load on the internal combustion engine and a state of the internal combustion engine; and calculating the fluid consumption rate based on the instantaneous fuel consumption, the load on the internal combustion engine, and the state of the internal combustion engine.

A system is also disclosed. The system includes an internal combustion engine. The internal combustion engine has a governor and a fuel rack, the governor and the fuel rack collectively controlling an amount of fuel provided to the internal combustion engine. The system also includes a powered system to be powered by the internal combustion engine. A coupling means connects the internal combustion engine to the powered system. A controller controls one or more operations of the internal combustion engine and/or the powered system. The controller calculates a fluid consumption rate based on instantaneous fuel consumption, a load on the internal combustion engine, and one or more operating conditions that are based on a current state of the powered system.

A transport refrigeration system (TRS) is also disclosed. The TRS includes a transport unit and an internal combustion engine. The internal combustion engine has a governor and a fuel rack. The governor and the fuel rack collectively control an amount of fuel provided to the internal combustion engine. The system also includes a powered system to be powered by the internal combustion engine. A coupling means connects the internal combustion engine to the powered system. A controller controls one or more operations of the internal combustion engine and/or the powered system. The controller calculates a fuel consumption rate based on instantaneous fuel consumption, a load on the internal combustion engine, and one or more operating conditions that are based on a current state of the powered system.

BRIEF DESCRIPTION OF THE DRAWINGS

References are made to the accompanying drawings that form a part of this disclosure, and which illustrate embodiments in which the systems and methods described in this specification may be practiced.

Like reference numbers represent like parts throughout.

DETAILED DESCRIPTION

This disclosure relates generally to fluid level measurements. More specifically, the disclosure relates to a system and method for determining a fluid consumption rate, such as a fuel consumption rate.

Embodiments described in this specification include a system and method for determining a fuel consumption rate based on current settings (e.g., temperature settings in the conditioned space, etc.) that can be dynamically changing, a current driver of the transport unit, a load associated with the transport unit, or the like.

A fuel consumption rate and/or a fuel amount consumed (e.g., a total fuel amount for a particular period of time) can be, for example, displayed on a display device such as a human machine interface (HMI) of the TRS, and can be, for example, stored in a storage device (e.g., a memory, etc.) of the TRS. In an embodiment, the fuel consumption rate and/or fuel amount consumed can be transmitted via a network (e.g., a cellular network, a local area network, a wide area network, etc.). In an embodiment, the fuel consumption rate and/or fuel amount consumed can be accessible via a computing device (e.g., a laptop, personal computer, a cellular phone, a tablet computer, etc.) over, for example, the Internet. The systems and methods described herein can provide for viewing fuel consumption over time, and can provide additional information that is generally unavailable using current fuel measurement methods.

A transport refrigeration system ("TRS") is generally used to control one or more environmental conditions such as, but not limited to, temperature, humidity, and/or air quality of a refrigerated transport unit. Examples of refrigerated transport units include, but are not limited to, a container on a flat car, an intermodal container, a truck, a boxcar, or other similar transport units. A refrigerated transport unit can be used to transport perishable items such as, but not limited to, produce, frozen foods, and meat products.

A TRS can include a transport refrigeration unit (TRU) which is attached to a transport unit to control one or more environmental conditions (e.g., temperature, humidity, air quality, etc.) of an interior space of the refrigerated transport unit. The TRU can include, without limitation, a compressor, a condenser, an expansion valve, an evaporator, and one or more fans or blowers to control the heat exchange between the air within the interior space and the ambient air outside of the refrigerated transport unit.

A transport unit includes, for example, a container on a flat car, an intermodal container, truck, a boxcar, or other similar transport unit.

A transport refrigeration system (TRS) includes, for example, a refrigeration system for controlling the refrigeration of an interior space of a refrigerated transport unit. The TRS may be a vapor-compressor type refrigeration system, a thermal accumulator type system, or any other suitable refrigeration system that can use refrigerant, cold plate technology, or the like.

A refrigerated transport unit includes, for example, a transport unit having a TRS.

A fluid includes, for example, a fuel. A fuel includes, for example, any fluid suitable for combustion by an internal combustion engine. A fuel can be used in a liquid form. Examples of fuels include, but are not limited to, gasoline, diesel fuel, or the like.

A fuel rack includes, for example, a mechanical linkage which controls an amount of fuel to be injected into a cylinder of an internal combustion engine on each stroke. A position of the fuel rack is generally controlled by a governor of the internal combustion engine. The governor can determine an amount of fuel needed to maintain a particular speed, and accordingly can adjust the position of the fuel rack. The fuel rack and governor can function according to generally known principles.

Embodiments of this disclosure may be used in any suitable environmentally controlled transport apparatus, such as, but not limited to, an over the road truck cabin, an HVAC system for a bus, or the like, where an internal combustion engine is used to power a TRS.

Figure 1:
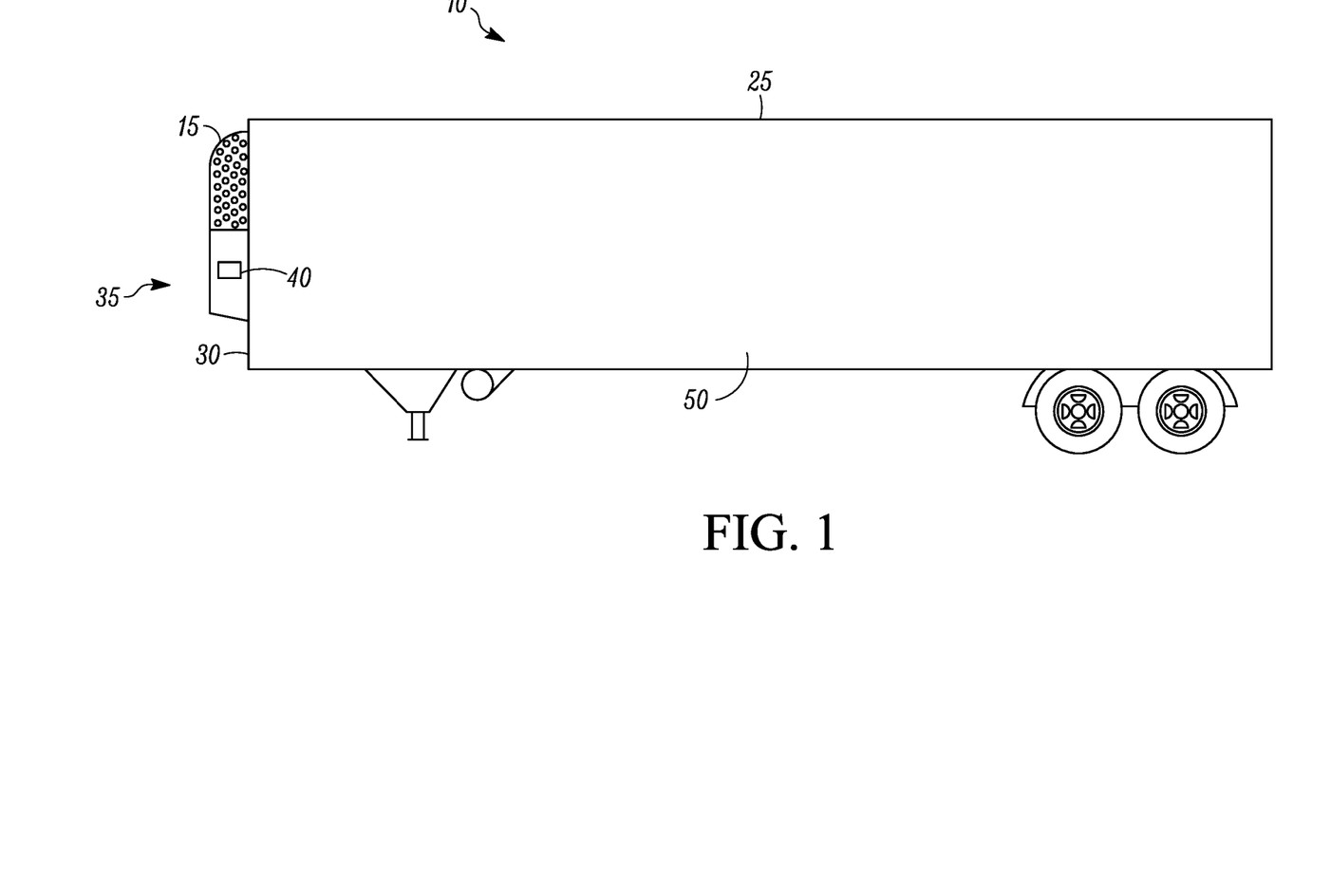
FIG. 1 is a side view of a transport vehicle including an environmentally controlled space, according to an embodiment.

FIG. 1 is a side view of a transport refrigeration system (TRS) 10 for a transport unit 25, according to an embodiment. The illustrated transport unit 25 is a trailer-type transport unit. Embodiments as described in this specification can be used with other types of transport units. For example, the transport unit 25 can represent a container (e.g., a container on a flat car, an intermodal container, etc.), a truck, a boxcar, or other similar type of transport unit having an interior space that can be environmentally controlled.

The TRS 10 is configured to control one or more environmental conditions such as, but not limited to, temperature, humidity, and/or air quality of an interior space 50 of the transport unit 25. In an embodiment, the interior space 50 can alternatively be referred to as the conditioned space 50, the cargo space 50, the environmentally controlled space 50, or the like. In particular, the TRS 10 is configured to transfer heat between the air inside the interior space 50 and the ambient air outside of the transport unit 25.

The interior space 50 can include one or more partitions or internal walls (not shown) for at least partially dividing the interior space 50 into a plurality of zones or compartments, according to an embodiment. It is to be appreciated that the interior space 50 may be divided into any number of zones and in any configuration that is suitable for refrigeration of the different zones. In some examples, each of the zones can have a set point temperature that is the same or different from one another.

The TRS 10 includes a transport refrigeration unit (TRU) 15. The TRU 15 is provided on a front wall 30 of the transport unit 25. The TRU 15 can include an internal combustion engine (not shown) that provides mechanical power directly to a component (e.g., a compressor, etc.) of the TRS 10. In an embodiment, the engine of the TRU 15 can provide power directly to an alternator (not shown), which can be used to power the component. In such embodiments, the TRU 15 can include an electric drive motor that provides mechanical power directly to the component (e.g., a compressor, etc.) of the TRS 10.

The TRU 15 includes a programmable TRS Controller 35 that includes a single integrated control unit 40. It will be appreciated that in other embodiments, the TRS Controller 35 may include a distributed network of TRS control elements (not shown). The number of distributed control elements in a given network can depend upon the particular application of the principles described in this specification. The TRS Controller 35 can include a processor, a memory, a clock, and an input/output (I/O) interface (not shown). The TRS Controller 35 can include fewer or additional components.

The TRU 15 can also include a closed heat transfer circuit (not shown in FIG. 1). Generally, the TRS Controller 35 can be configured to control a heat transfer cycle (e.g., controlling the closed heat transfer circuit of the TRU 15) of the TRS 10. In one example, the TRS Controller 35 controls the heat transfer cycle of the TRS 10 to obtain various operating conditions (e.g., temperature, humidity, air quality, etc.) of the interior space 50.

The TRS 10 includes an internal combustion engine (not shown), according to an embodiment. In an embodiment, the internal combustion engine can generally include a cooling system (e.g., water or liquid coolant system), an oil lubrication system, and an electrical system. An air filtration system can filter air directed into a combustion chamber of the internal combustion engine. In an embodiment, the internal combustion engine is not specifically configured for the TRS 10, but can be a non-industrial internal combustion engine, such as an automotive internal combustion engine.

Figure 2:
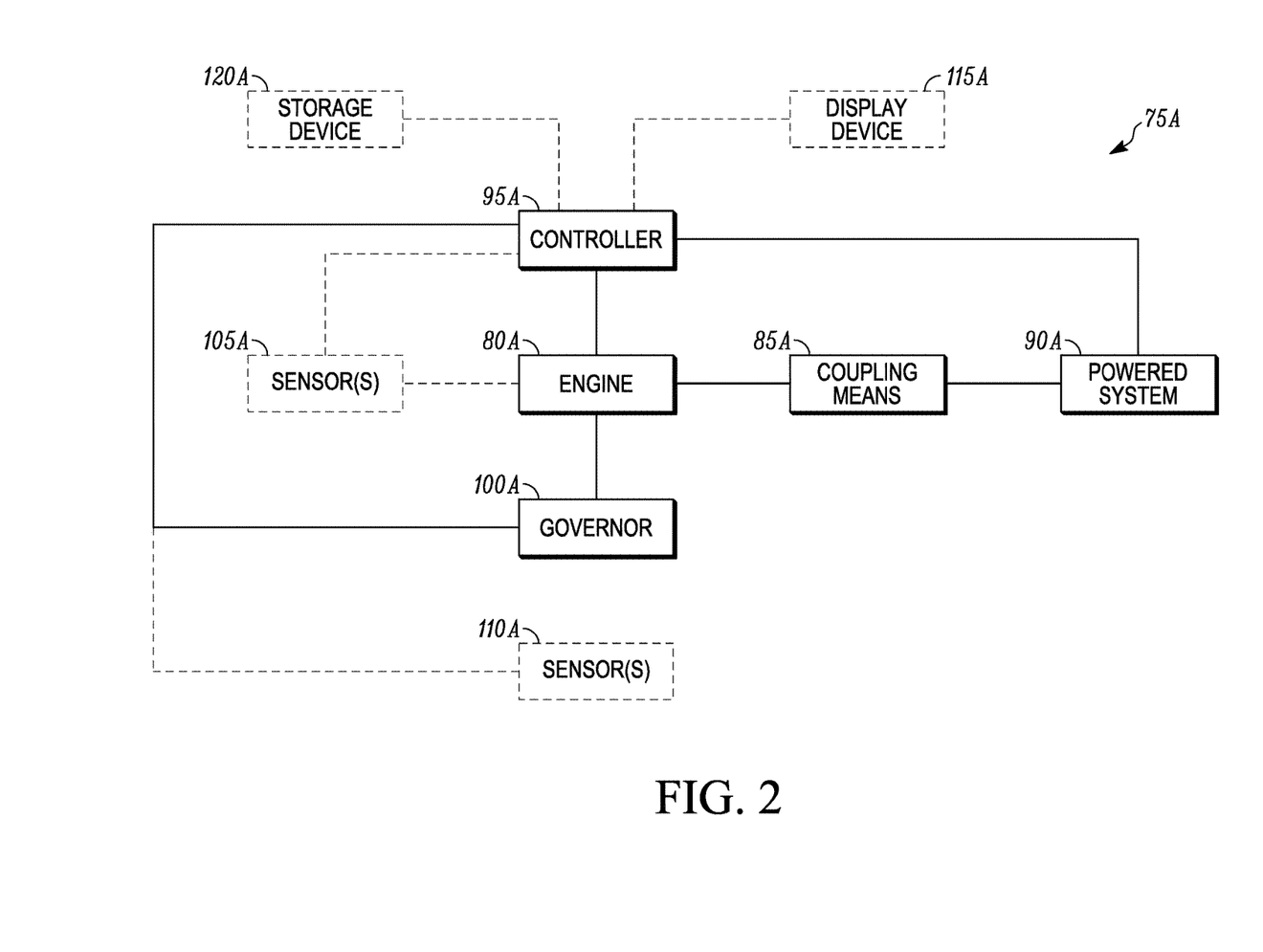
FIG. 2 is a schematic diagram of a system for implementing fluid level measurement systems and methods as described in this specification, according to an embodiment.
Figure 3A:
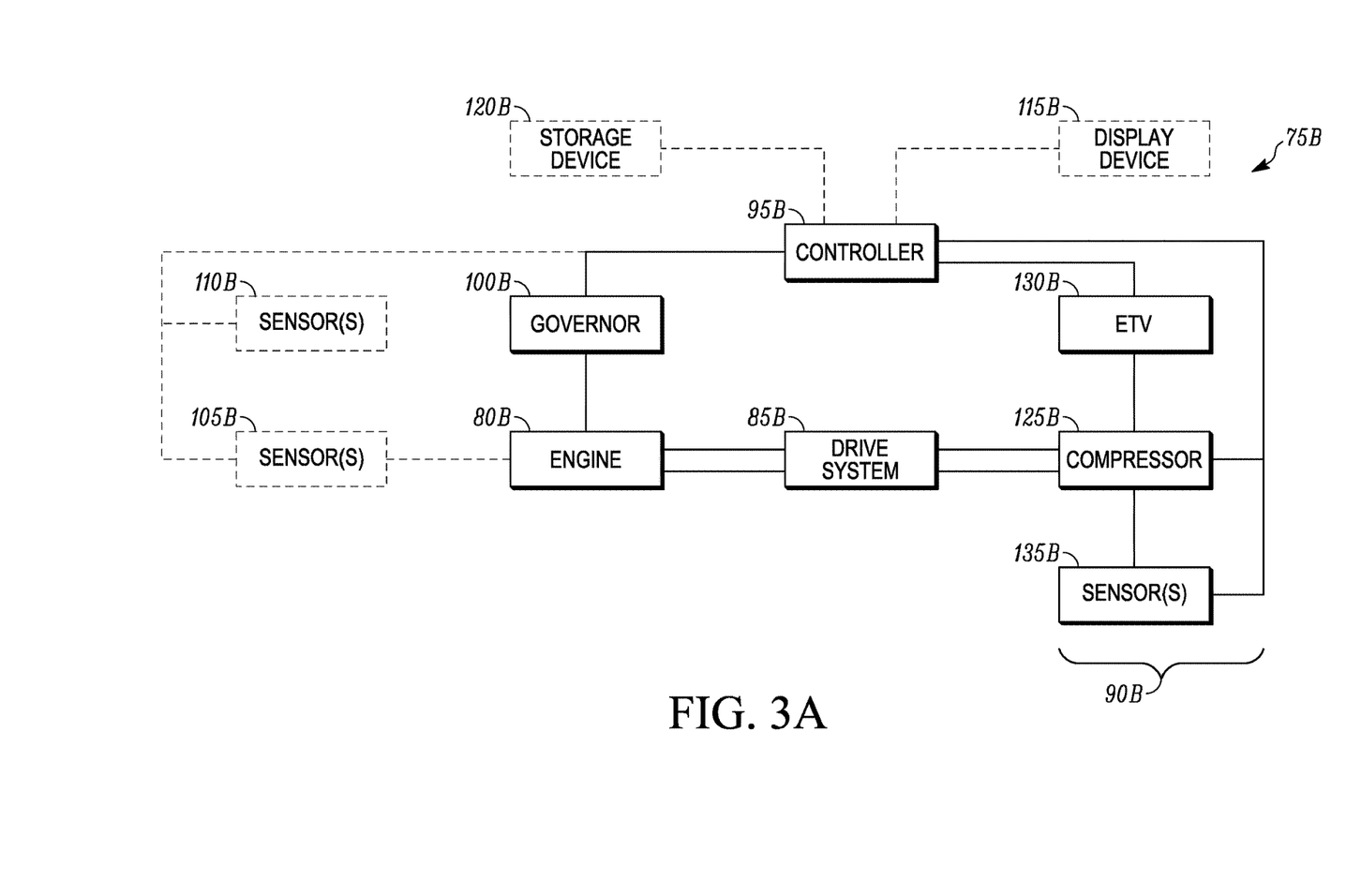
FIG. 3A is a schematic diagram of a system for implementing fluid level measurement systems and methods as described in this specification, according to a first embodiment.
Figure 3B:
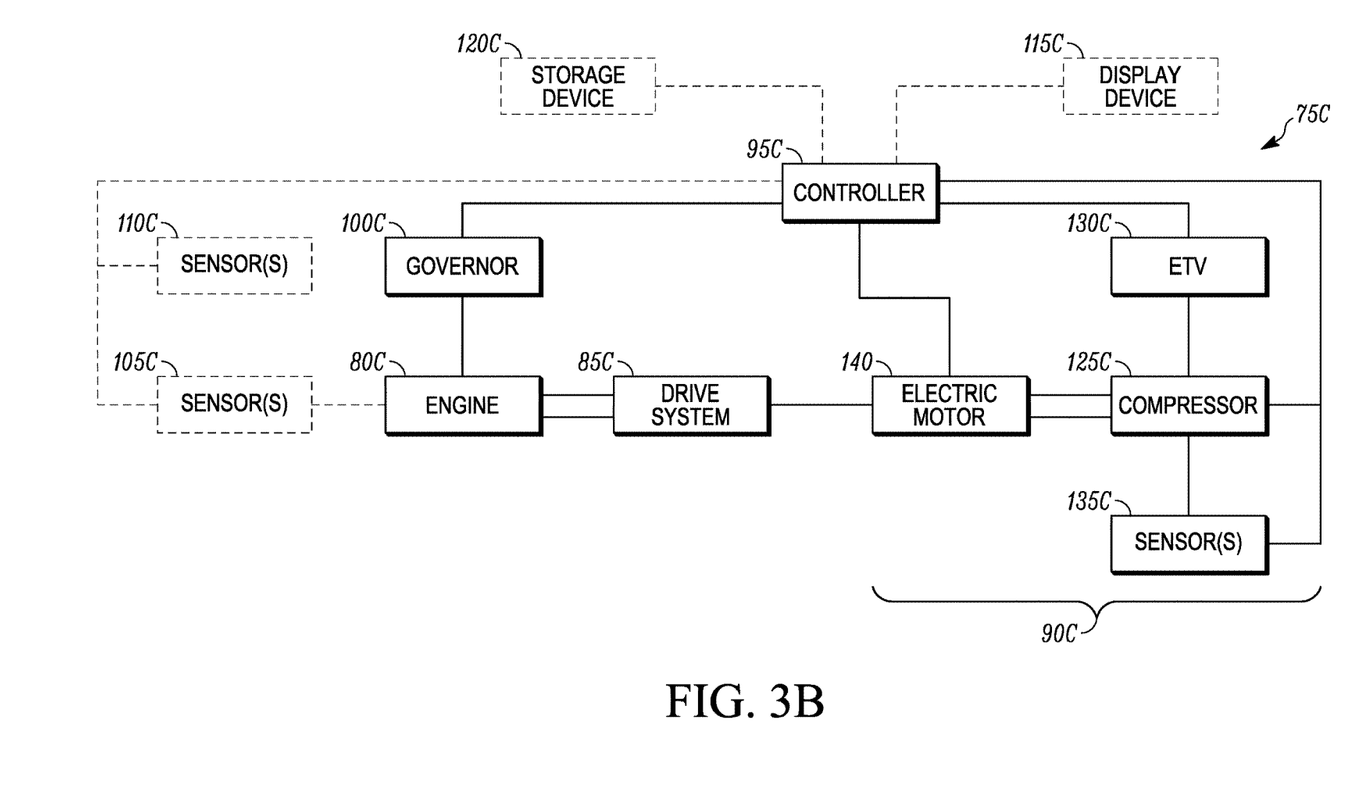
FIG. 3B is a schematic diagram of a system for implementing fluid level measurement systems and methods as described in this specification, according to a second embodiment.

FIGS. 2 and 3A-3B are schematic diagrams of systems 75A-75C for implementing fluid level measurement systems and methods as described in this specification, according to an embodiment. The embodiments in FIGS. 3A and 3B generally represent two particular embodiments of the general system 75A shown in FIG. 2. The systems 75A-75C include aspects which may be the same or similar. For simplicity of this specification, aspects which are the same or similar will not be re-described for each figure.

FIG. 2 is a schematic diagram of a system 75A for implementing fluid level measurement systems and methods as described in this specification, according to an embodiment.

The system 75A includes an internal combustion engine 80A, a coupling means 85A, and a powered system 90A. The powered system 90A can receive power from the internal combustion engine 80A via the coupling means 85A. That is, the powered system 90A is powered by the internal combustion engine 80A. In an embodiment, the internal combustion engine 80A can be mechanically coupled to a component of the powered system 90A via the coupling means 85A (see FIG. 3A). In an embodiment, the internal combustion engine 80A can be mechanically coupled to, for example, an electric motor which drives the component of the powered system 90A via the coupling means 85A (see FIG. 3B).

The internal combustion engine 80A can be a diesel powered internal combustion engine, a gasoline powered internal combustion engine, an alternative fuel powered internal combustion engine, or the like.

The coupling means 85A can include, for example, a belt, a chain, or other similar drive system, or the like, which mechanically couples the internal combustion engine 80A and a component of the powered system 90A (e.g., a compressor in a refrigeration system, etc.). In such an embodiment, the component may be operable at speeds which are proportional to the speeds of the internal combustion engine 80A. Such an embodiment is shown and described in further detail in accordance with FIG. 3A below. Alternatively, the coupling means 85A can couple the internal combustion engine 80A to a generator, alternator, or the like, which provides power to an electric motor to power the powered system 90A. Such an embodiment is shown and described in further detail in accordance with FIG. 3B below.

The powered system 90A can include a variety of systems. In general, the powered system 90A is representative of a TRS (e.g., TRS 10 in FIG. 1). It will be appreciated that the powered system 90A can be representative of systems other than the TRS 10. The powered system 90A can include any system which provides a load for the internal combustion engine 80A.

The engine 80A is electrically connected to a controller 95A. In an embodiment, the controller 95A can be the TRS Controller 35 (FIG. 1) for the TRS 10. It will be appreciated that the controller 95A can be separate from the TRS Controller 35, according to an embodiment. The controller 95A can also be electrically connected to one or more components of the powered system 90A. It is to be appreciated that the controller 95A can be a single controller electrically connected to the engine 80A and the powered system 90A, according to an embodiment, and can be a plurality of controllers collectively referred to as the controller 95A, according to an embodiment.

The internal combustion engine 80A includes a governor 100A for speed and fuel management of the internal combustion engine 80A. The governor 100A can determine an amount of fuel needed to maintain a particular speed for the internal combustion engine 80A, and accordingly can adjust a position of a fuel rack (not shown). The fuel rack and governor 100A can function according to generally known principles.

One or more sensors 105A can be electrically connected to the controller 95A and a component of the internal combustion engine 80A. The one or more sensors 105A can be used to, for example, determine a position of the fuel rack (e.g., a fuel rack position sensor, etc.). In such an embodiment, instantaneous fuel consumption can be determined based on a sensed value from the one or more sensors 105A. In an embodiment, the instantaneous fuel consumption can be used to determine a fuel consumption rate and/or a total amount of fuel consumed. In an embodiment, the internal combustion engine 80A may include an electronic control unit (ECU).

The system 75A can additionally include one or more sensors 110A, according to an embodiment. The one or more sensors 110A can include, for example, an ambient temperature sensor, a fuel temperature sensor, or the like. The one or more sensors 110A can provide additional accuracy to instantaneous fuel consumption determinations by accounting for variations in fuel density as, for example, ambient temperatures and fuel temperatures vary.

The controller 95A can optionally be electrically connected to a display device 115A and/or a storage device 120A. The display device 115A can be, for example, a display such as a human machine interface (HMI) located on, for example, the TRU 15 (FIG. 1). In operation, the instantaneous fuel consumption, fuel consumption rates, amount of fuel consumed, or the like, which are determined may be displayed on the display device 115A for an operator of the TRS 10 to review. The storage device 120A can be, for example, a data logger which receives and stores data relating to operations of the TRU 15. In operation, the instantaneous fuel consumption, fuel consumption rates, amount of fuel consumed, or the like, which are determined may be stored in the storage device 120A. It will be appreciated that the information stored on the storage device 120A may be reviewable to review historical fuel consumption information, identify fuel consumption trends, predict a component maintenance interval, such as need for fuel tank maintenance, etc.

FIG. 3A is a schematic diagram of a system 75B for implementing fluid level measurement systems and methods as described in this specification, according to an embodiment. Aspects of FIG. 3A may be the same as or similar to aspects of FIG. 2. FIG. 3A includes a powered system 90B. The powered system 90B includes a plurality of components of the TRU 15 (FIG. 1), according to an embodiment. That is, the powered system 90B is generally representative of a refrigeration system such as the TRS 10 (FIG. 1).

The powered system 90B includes a compressor 125B, an electronic throttling valve (ETV) 130B, and one or more sensors 135B. The compressor 125B in the system 75B can be mechanically coupled to the internal combustion engine 80B via the drive system 85B. The drive system 85B can include, for example, a belt, a chain, or the like, which mechanically couples the internal combustion engine 80B and a component of the powered system 90B (e.g., the compressor 125B). As a result, the compressor 125B can be operable at speeds proportional to the speeds of the internal combustion engine 80B. For purposes of illustration, the mechanical connections in FIG. 3A are illustrated as a double line between the internal combustion engine 80B, the drive system 85B, and the compressor 125B.

The one or more sensors 135B can provide a variety of information about an operating state or status of the powered system 90B (e.g., the TRS 10). For example, the one or more sensors 135B can include one or more pressure sensors (e.g., a pressure sensor to determine a suction pressure, a discharge pressure, etc., of the compressor 125B), one or more temperature sensors (e.g., a temperature sensor to determine a suction temperature, a discharge temperature, etc. of the compressor 125B), a position sensor which indicates a position of the ETV 130B, or the like. The information determined from the one or more sensors 135B is generally representative of a load on the internal combustion engine 80B. The information can be used by the controller 95B in determining fuel consumption.

FIG. 3B is a schematic diagram of a system 75C for implementing fluid level measurement systems and methods as described in this specification, according to an embodiment. Aspects of FIG. 3B may be the same as or similar to aspects of FIG. 3A. FIG. 3B includes a powered system 90C. The powered system 90C includes a plurality of components of the TRU 15 (FIG. 1), according to an embodiment. That is, the powered system 90C is generally representative of a refrigeration system such as the TRS 10 (FIG. 1).

The powered system 90C is generally representative of the TRS 10 when driven by an electric motor 140C. In the system 75C, the internal combustion engine 80C can provide power to an electric motor 140C through a drive system 85C that provides mechanical power to, for example, an alternator, generator, or the like, which can in turn provide electrical power to the electric motor 140C. In an embodiment, the electric motor 140C can be generally considered to be a part of the powered system 90C. A shaft (not shown) of the electric motor 140C can provide mechanical power to the powered system 90C. For purposes of illustration, the mechanical connections in FIG. 3B are illustrated as a double line between the internal combustion engine 80C and the drive system 85C, and between the electric motor 140C and the compressor 125C.

Figure 4:
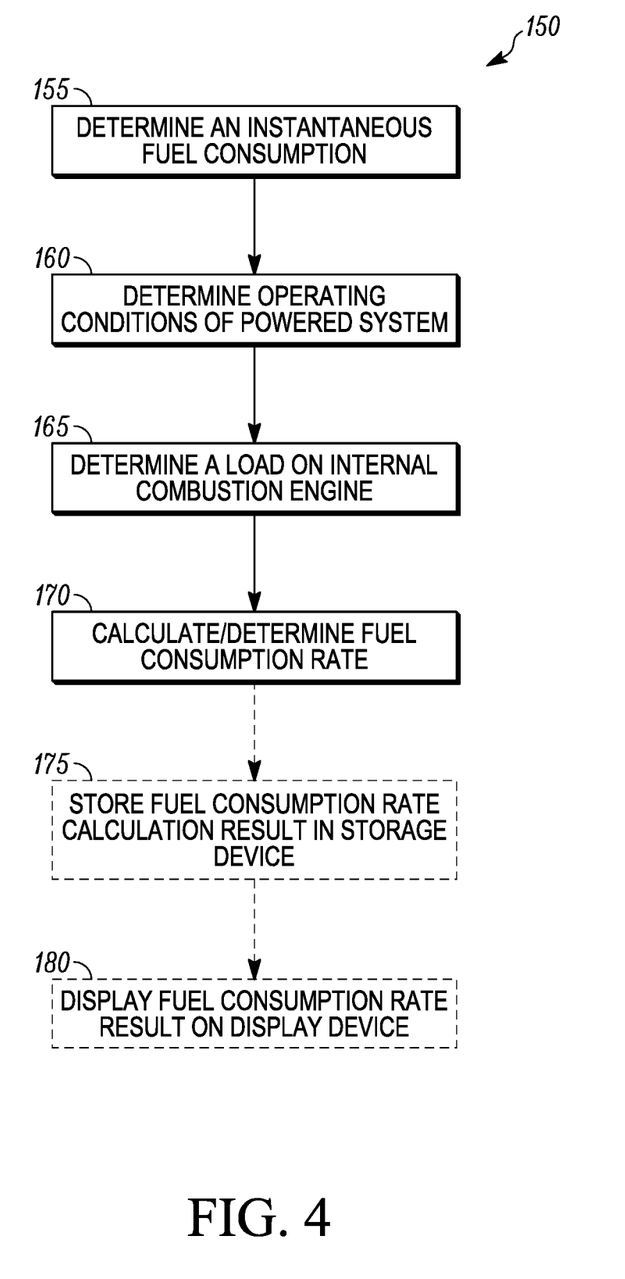
FIG. 4 is a flowchart of a method for determining a fluid consumption rate, according to an embodiment.

FIG. 4 is a flowchart of a method 150 for determining a fluid consumption rate, according to an embodiment. The method 150 generally includes determining an instantaneous fuel consumption of an internal combustion engine (e.g., the internal combustion engine 80A-80C in FIGS. 2, 3A-3B), determining one or more operating conditions of a powered system (e.g., powered system 90A-90C in FIGS. 2, 3A-3B), determining a load on the internal combustion engine, and calculating a fuel consumption rate. In an embodiment, the method can additionally include, for example, predicting a maintenance interval of a component, subsystem, or auxiliary supporting system, or the like.

At 155, instantaneous fuel consumption is determined by a controller (e.g., controller 95A-95C (FIGS. 2, 3A-3B)). In an embodiment, the instantaneous fuel consumption can be based on a rack position of the fuel rack of the internal combustion engine 80A-80C. In such an embodiment, the rack position can be determined based on a duty cycle of a governor (e.g., governor 100A-100C (FIGS. 2, 3A-3B)), a power measurement from the governor 100A-100C, and one or more temperature measurements (e.g., an ambient temperature, a fuel temperature, or the like, from the one or more sensors 110A-110C (FIGS. 2, 3A-3B)). In an embodiment, the rack position can be determined based on just the duty cycle of the governor 100A-100C. In an embodiment, the rack position can be determined by a rack position sensor (e.g., the one or more sensors 105A-105C (FIG. 1)). In such an embodiment, the duty cycle of the governor 100A-100C, the power measurement from the governor 100A-100C, and/or the one or more temperature measurements from the one or more sensors 110A-110C may be redundant. Accordingly, in such an embodiment, these redundant measurements may not be used in determining the instantaneous fuel consumption.

In an embodiment in which the internal combustion engine 80A-80C does not include governor 100A-100C, the instantaneous fuel consumption may alternatively be determined by, for example, determining an exhaust gas temperature of the gas exhausted from the internal combustion engine 80A-80C. In an embodiment, the instantaneous fuel consumption can alternatively be determined by measuring a volume of fuel in the tank and determining a change rate in the volume of the fuel in the tank.

At 160, the controller determines one or more operating conditions which are representative of a current state of the powered system. For example, in an embodiment, the controller can determine one or more values from one or more sensors which are indicative of state or status of the powered system. For example, the one or more sensors can include values determined for a current suction pressure, discharge pressure, suction temperature, discharge temperature, ETV position, or the like.

At 165, a load on the internal combustion engine 80A-80C is determined. This can include determining a current revolutions per minute (RPM) of the internal combustion engine 80A-80C. In an embodiment, a baseline of engine load versus RPM may be provided from a manufacturer of the internal combustion engine. In an embodiment, the engine load can be determined based on, for example, a temperature of an exhaust gas output from the engine. The engine load is generally representative of power applied by the internal combustion engine 80A-80C. For example, the engine load can be based on an RPM of the internal combustion engine 80A-80C, an alternator or generator belt load, and a suction pressure.

At 170, the fuel consumption rate is determined based on the determined instantaneous fuel consumption, load and engine state, and operating conditions of the powered system. The fuel consumption rate may be a calculated fluid flowrate. In an embodiment, the calculated fluid flowrate can be used to determine a fuel amount consumed over a period of time, and accordingly, can also be used to estimate a fuel amount remaining if, for example, a tank size, starting level, or other similar information is known.

Optionally, at 175, the fuel consumption rate calculation result can be stored, for example, in a storage device of the system. Optionally, at 180, the fuel consumption calculation result can be displayed on the display device.

Aspects:

It is noted that any one of aspects 1-7 can be combined with any one of aspects 8-14 and any one or aspects 15-20. Any one of aspects 8-14 can be combined with any one of aspects 15-20.

Aspect 1. A method for determining a fluid consumption rate indicating a fluid consumption rate of a fluid in a fluid tank, the fluid tank including a fuel for an internal combustion engine, the internal combustion engine providing power to a powered system, the method comprising:

determining instantaneous fluid consumption;

determining an operating condition of the powered system, the operating condition being based on a current state of the powered system, the powered system providing a load on the internal combustion engine;

determining the load on the internal combustion engine and a state of the internal combustion engine; and calculating the fluid consumption rate based on the instantaneous fuel consumption, the load on the internal combustion engine, and the state of the internal combustion engine.

Aspect 2. The method according to aspect 1, wherein determining the instantaneous fluid consumption includes using a rack position of a fuel rack for the internal combustion engine.

Aspect 3. The method according to aspect 2, wherein calculating the rack position of the fuel rack for the internal combustion engine includes correlating a duty cycle signal of a governor for the internal combustion engine and a power measurement from an actuator of the governor.

Aspect 4. The method according to aspect 3, wherein calculating the rack position of the fuel rack for the internal combustion engine further includes determining one or more of an ambient temperature and a temperature of the fluid.

Aspect 5. The method according to any one of aspects 1-4, wherein the powered system is a transport refrigeration system including a compressor, an electronic throttling valve, and one or more sensors; and wherein determining an operating condition of the powered system includes one or more of determining a suction pressure of the compressor from the one or more sensors, determining a discharge pressure of the compressor from the one or more sensors, determining a position of the electronic throttling valve, and determining an exhaust gas temperature from the internal combustion engine.

Aspect 6. The method according to any one of aspects 1-5, wherein determining a load on the internal combustion engine and an engine state includes one or more of a revolutions per minute (RPM) of the internal combustion engine or a rated engine output reference.

Aspect 7. The method according to any one of aspects 1-6, wherein determining the instantaneous fluid consumption and the fluid consumption rate includes determining a position of a fuel rack for the internal combustion engine using a rack position sensor.

Aspect 8. A system, comprising:

an internal combustion engine, the internal combustion engine having a governor and a fuel rack, the governor and the fuel rack collectively controlling an amount of fuel provided to the internal combustion engine;

a powered system to be powered by the internal combustion engine;

a coupling means that connects the internal combustion engine to the powered system; and a controller that controls one or more operations of the internal combustion engine and/or the powered system, wherein the controller calculates a fuel consumption rate based on instantaneous fuel consumption, a load on the internal combustion engine, and one or more operating conditions that are based on a current state of the powered system.

Aspect 9. The system according to aspect 8, further comprising one or more sensors electrically connected to the controller.

Aspect 10. The system according to aspect 9, wherein the one or more sensors include one or more of an ambient temperature sensor, a fuel rack position sensor, and a fuel temperature sensor.

Aspect 11. The system according to any one of aspects 8-10, wherein the powered system includes a compressor, an electronic throttling valve, and one or more sensors that determine the one or more operating conditions of the powered system.

Aspect 12. The system according to aspect 11, wherein the coupling means mechanically connects the internal combustion engine to the compressor such that the compressor operates at a speed proportional to the internal combustion engine.

Aspect 13. The system according to aspect 11, wherein the powered system further includes an electric motor, wherein the internal combustion engine provides electric power for the electric motor and the electric motor provides mechanical power to the compressor.

Aspect 14. The system according to any one of aspects 8-13, wherein the system is a transport refrigeration system.

Aspect 15. A transport refrigeration system (TRS), comprising:

a transport unit;

an internal combustion engine, the internal combustion engine having a governor and a fuel rack, the governor and the fuel rack collectively controlling an amount of fuel provided to the internal combustion engine;

a powered system to be powered by the internal combustion engine;

a coupling means that connects the internal combustion engine to the powered system; and a controller that controls one or more operations of the internal combustion engine and/or the powered system, wherein the controller calculates a fuel consumption rate based on instantaneous fuel consumption, a load on the internal combustion engine, and one or more operating conditions that are based on a current state of the powered system.

Aspect 16. The TRS according to aspect 15, further comprising one or more sensors electrically connected to the controller.

Aspect 17. The TRS according to aspect 16, wherein the one or more sensors include one or more of an ambient temperature sensor, a fuel rack position sensor, and a fuel temperature sensor.

Aspect 18. The TRS according to any one of aspects 15-17, wherein the powered system includes a compressor, an electronic throttling valve, and one or more sensors that determine the one or more operating conditions of the powered system.

Aspect 19. The TRS according to aspect 18, wherein the coupling means mechanically connects the internal combustion engine to the compressor such that the compressor operates at a speed proportional to the internal combustion engine.

Aspect 20. The TRS according to aspect 18, wherein the powered system further includes an electric motor, wherein the internal combustion engine provides electric power for the electric motor and the electric motor provides mechanical power to the compressor.

Aspect 21. The TRS according to any one of aspects 15-20, wherein the controller calculates one or more of historical fuel consumption information, calculates fuel consumption trends, predicts a component maintenance interval.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for determining a fluid consumption rate indicating a fluid consumption rate of a fluid in a fluid tank, the fluid tank including a fuel for an internal combustion engine, the internal combustion engine providing power to a powered system, the method comprising:
- determining instantaneous fluid consumption using a rack position of a fuel rack for the internal combustion engine;
- determining an operating condition of the powered system, the operating condition being based on a current state of the powered system, the powered system providing a load on the internal combustion engine;
- determining the load on the internal combustion engine and a state of the internal combustion engine; and
- calculating the fluid consumption rate based on the instantaneous fluid consumption, the load on the internal combustion engine, and the state of the internal combustion engine, the calculating including one or more of: correlating a duty cycle signal of a governor for the internal combustion engine and a power measurement from an actuator of the governor.

2. The method according to claim 1, wherein calculating the rack position of the fuel rack for the internal combustion engine further includes determining one or more of an ambient temperature and a temperature of the fluid.

3. The method according to claim 1, wherein the powered system is a transport refrigeration system including a compressor, an electronic throttling valve, and one or more sensors; and
- wherein determining an operating condition of the powered system includes one or more of determining a suction pressure of the compressor from the one or more sensors, determining a discharge pressure of the compressor from the one or more sensors, determining a position of the electronic throttling valve, and determining an exhaust gas temperature from the internal combustion engine.

4. The method according to claim 1, wherein determining the instantaneous fluid consumption and the fluid consumption rate includes determining a position of a fuel rack for the internal combustion engine using a rack position sensor.

5. A system, comprising:
- an internal combustion engine, the internal combustion engine having a governor and a fuel rack, the governor and the fuel rack collectively controlling an amount of fuel provided to the internal combustion engine;
- a powered system to be powered by the internal combustion engine;
- a coupling means that connects the internal combustion engine to the powered system; and
- a controller that controls one or more operations of the internal combustion engine and/or the powered system, wherein the controller calculates a fuel consumption rate based on instantaneous fuel consumption, a load on the internal combustion engine, and one or more operating conditions that are based on a current state of the powered system, including one or more of: correlating a duty cycle signal of the governor for the internal combustion engine and a power measurement from an actuator of the governor.

6. The system according to claim 5, further comprising one or more sensors electrically connected to the controller.

7. The system according to claim 6, wherein the one or more sensors include one or more of an ambient temperature sensor, a fuel rack position sensor, and a fuel temperature sensor.

8. The system according to claim 5, wherein the powered system includes a compressor, an electronic throttling valve, and one or more sensors that determine the one or more operating conditions of the powered system.

9. The system according to claim 8, wherein the coupling means mechanically connects the internal combustion engine to the compressor such that the compressor operates at a speed proportional to the internal combustion engine.

10. The system according to claim 8, wherein the powered system further includes an electric motor, wherein the internal combustion engine provides electric power for the electric motor and the electric motor provides mechanical power to the compressor.

11. The system according to claim 5, wherein the system is a transport refrigeration system.

12. A transport refrigeration system (TRS), comprising:
- a transport unit;
- an internal combustion engine, the internal combustion engine having a governor and a fuel rack, the governor and the fuel rack collectively controlling an amount of fuel provided to the internal combustion engine;
- a powered system to be powered by the internal combustion engine;
- a coupling means that connects the internal combustion engine to the powered system; and
- a controller that controls one or more operations of the internal combustion engine and/or the powered system, wherein the controller calculates a fuel consumption rate based on instantaneous fuel consumption, a load on the internal combustion engine, and one or more operating conditions that are based on a current state of the powered system, including one or more of: correlating a duty cycle signal of the governor for the internal combustion engine and a power measurement from an actuator of the governor.

13. The TRS according to claim 12, further comprising one or more sensors electrically connected to the controller.

14. The system according to claim 13, wherein the one or more sensors include one or more of an ambient temperature sensor, a fuel rack position sensor, and a fuel temperature sensor.

15. The system according to claim 12, wherein the powered system includes a compressor, an electronic throttling valve, and one or more sensors that determine the one or more operating conditions of the powered system.

16. The system according to claim 15, wherein the coupling means mechanically connects the internal combustion engine to the compressor such that the compressor operates at a speed proportional to the internal combustion engine.

17. The system according to claim 15, wherein the powered system further includes an electric motor, wherein the internal combustion engine provides electric power for the electric motor and the electric motor provides mechanical power to the compressor.

* * * * *